(12) United States Patent
Bae et al.

(10) Patent No.: US 7,982,584 B2
(45) Date of Patent: Jul. 19, 2011

(54) MOBILE RFID READER AND CONTROL METHOD THEREOF

(75) Inventors: Ji-Hoon Bae, Daejon (KR); Hee-Sook Mo, Daejon (KR); Dong-Han Lee, Daejon (KR); Chan-Won Park, Daejon (KR); Gil-Young Choi, Daejon (KR); Cheol-Sig Pyo, Daejon (KR); Jong-Suk Chae, Daejon (KR)

(73) Assignee: Electronics and Telecommunications Research Institute, Daejon (JP)

( * ) Notice: Subject to any disclaimer, the term of this patent is extended or adjusted under 35 U.S.C. 154(b) by 761 days.

(21) Appl. No.: 11/526,517

(22) Filed: Sep. 25, 2006

(65) Prior Publication Data

US 2007/0069859 A1 Mar. 29, 2007

(30) Foreign Application Priority Data

Sep. 23, 2005 (KR) .................. 10-2005-0088871
May 11, 2006 (KR) .................. 10-2006-0042578

(51) Int. Cl.
*H04Q 5/22* (2006.01)

(52) U.S. Cl. .............. 340/10.1; 340/825.69; 340/825.56

(58) Field of Classification Search .................. 340/10.1, 340/825.69, 825.56; 370/329, 310, 328; 375/295, 133, 132
See application file for complete search history.

(56) References Cited

U.S. PATENT DOCUMENTS

| 4,361,906 A | * | 11/1982 | Sakamoto | 455/140 |
| 6,594,302 B1 | * | 7/2003 | Lansford | 375/133 |
| 6,643,278 B1 | * | 11/2003 | Panasik et al. | 370/330 |
| 6,952,157 B1 | * | 10/2005 | Stewart et al. | 340/10.2 |
| 2004/0066281 A1 | | 4/2004 | Hughes et al. | |
| 2005/0228853 A1 | * | 10/2005 | Yamamura et al. | 709/200 |
| 2006/0001525 A1 | * | 1/2006 | Nitzan et al. | 340/10.1 |
| 2006/0022800 A1 | * | 2/2006 | Krishna et al. | 340/10.2 |

FOREIGN PATENT DOCUMENTS

| JP | 2000-174658 A | | 6/2000 |
| JP | 2004185242 A | * | 7/2004 |
| KR | 1020040018038 A | | 3/2004 |
| KR | 10-0641380 B1 | | 10/2006 |
| KR | 1020060112976 A | | 11/2006 |
| KR | 10-0666338 B1 | | 1/2007 |

* cited by examiner

*Primary Examiner* — Vernal U Brown
(74) *Attorney, Agent, or Firm* — Ladas & Parry LLP

(57) ABSTRACT

Provided are a mobile RFID reader and a control method thereof. The mobile RFID reader includes: a reader controller for beginning a reader operation to communicate with a tag in response to a command of a terminal controller of the wireless communication terminal; an anti-collision state machine for controlling collision among a plurality of tags, and transferring the result of communication with the tag to the reader controller; a reader transmitter for generating a reader command message decided at the anti-collision state machine, and coding and modulating the generated reader command message; a reader receiver for demodulating and decoding a tag signal received through an antenna, and reporting a tag response state to the anti-collision state machine; and a channel controller for selecting a channel to use to communicate with a tag in response to a command of the reader controller.

22 Claims, 5 Drawing Sheets

MOBILE RFID READER AND CONTROL METHOD THEREOF

FIELD OF THE INVENTION

The present invention relates to a mobile RFID reader and a control method thereof; and, more particularly, to a mobile RFID reader mounted at a wireless communication terminal for providing a core function of a RFID reader operated at a ultra-high frequency (UHF), and a control method thereof.

DESCRIPTION OF RELATED ART

Generally, Radio Frequency Identification (RFID) is a technology for recognizing, tracing, and managing human beings, animals, and/or objects with a tag attached thereto by writing or reading information in or out of a tag having its own identification information without a contact. An RFID system includes a plurality of electronic tags, or transponder, which will be simply referred to as tags hereinafter, and an RFID reader. Each tag has identification information and it is attached to an object or an animal, and the RFID reader writes or reads information in or out of the tags. RFID systems are divided into a mutual induction type and an electromagnetic wave type according to the communication method between the RFID reader and the tags. The RFID systems are also divided into an active type and a passive type according to whether the tags are operated with their own power source. They are also divided into a long wavelength RFID reader, an intermediate wavelength RFID reader, a short wavelength RFID reader, an ultra short wavelength RFID reader, and a microwave RFID reader. Diverse specifications are defined or under definition according to the above classification.

Meanwhile, a Ubiquitous Sensor Network (USN) connects and manages RFID tags in all places where data need to be collected in real-time and collects not only recognition information of objects having the tags attached thereto but also environmental information of the tags. Ultimately, the ubiquitous sensor network realizes a communication environment any time any place by giving computing and communication functions to all objects, regardless of the kinds of networks, devices, and services.

As for the frequency band of the RFID/USN wireless equipment, it is expected that an Ultra-High Frequency (UHF) ranging from 860 to 96 MHz could be used widely. Passive RFID/USN wireless equipment used in Korea is defined to perform access in a channel bandwidth of 200 kHz in the range of 908.5 to 914 MHz by using a Frequency Hopping Spread Spectrum (FHSS) or Listen Before Talk (LBT) frequency occupying method. The FHSS frequency occupying method shifts a frequency band to another after passing a predetermined channel occupying time using the frequency bands of multiple channels for interference avoidance. The FHSS frequency occupying method was selected by the United States who has a wide frequency band to use. The LBT channel occupying method searches an available channel before transmitting data. If the available channel is searched, the data is transmitted through the searched channel in the LBT channel occupying method. The LBT channel occupying method was selected as a standard channel occupying method in Europe who has a narrow frequency band to use. Meanwhile, Pulse Interval Encoding (PIE) is used as the encoding method of the RFID reader, and as for modulation, Double-SideBand Amplitude-Shift Keying (DSB-ASK), Single-SideBand Amplitude-Shift Keying (SSB-ASK), or Phase-Reversal Amplitude-Shift Keying (PR-ASK) is used. On the part of the tags, a FM0 (bi-phase space encoding) method or a Miller Sub-carrier method is used to encode data in the tags and ASK or Phase Shift Keying (PSK) is used for modulation in the tags.

There is an attempt to connect the RFID system composed of RFID readers and tags to a commercial mobile communication network to promote the use of RFID technology in more diverse fields and activate the RFID system. To connect the RFID system with the commercial mobile communication network, an RFID reader that can be built in a mobile terminal or connected to the mobile terminal as an additional device is required. However, no technology has provided a core function of the RFID reader used in the UHF band in the form of a single chip, which will be simply referred to as an MRF SoC, and this remains as an obstacle to practical use of the RFID technology.

SUMMARY OF THE INVENTION

It is, therefore, an object of the present invention to provide a mobile RFID reader for providing a core function of a RFID reader operated at an ultra-high frequency (UHF) as a single chip by being mounted at a wireless communication terminal, and a control method thereof.

It is another object of the present invention to provide a mobile RFID reader for supporting both of a FHSS frequency occupying method and a LBT frequency occupying method, and a control method thereof.

In accordance with an aspect of the present invention, there is provided a radio frequency identification (RFID) reader mountable to a wireless communication terminal, including: a reader controller for beginning a reader operation to communicate with a tag in response to a command of a terminal controller of the wireless communication terminal; an anti-collision state machine for controlling collision among a plurality of tags, and transferring the result of communication with the tag to the reader controller; a reader transmitter for generating a reader command message decided at the anti-collision state machine, and coding and modulating the generated reader command message; a reader receiver for demodulating and decoding a tag signal received through an antenna, and reporting a tag response state to the anti-collision state machine; and a channel controller for selecting a channel to use to communicate with a tag in response to a command of the reader controller.

The reader transmitter may include: a message generator for generating the reader command message; a CRC generator for generating a transmitting message by creating a CRC for the reader command message and adding the created CRC; an encoder for encoding the generated transmitting message; and a modulator for modulating the encoded transmitting message. Also, the reader receiver may include: a demodulator for demodulating a tag signal, which is received through an antenna and transformed to a digital signal; a decoder for decoding the demodulated tag signal; a CRC checker for checking a CRC of the decoded tag signal and reporting a response state of the tag to the anti-collision state machine; and a receiving message buffer for temporally storing a message of the decoded tag signal and transferring the stored message to the reader controller in response to a command of the anti-collision state machine.

The channel controller may include: a LBT controller for performing a Listen Before Talk (LBT) frequency occupying method control; and a FHSS controller for performing a Frequency Hopping Spread Spectrum (FHSS) frequency occupying method control, and the reader controller may select one of the LBT and the FHSS frequency occupying method to communicate with a tag. The reader controller may switch the frequency occupying method if tag data is not obtained for a predetermined time, and the LBT controller and the FHSS controller share a PLL controller. The LBT controller may include: a first generating unit for receiving a frequency band to perform the LBT frequency occupying method and generating a channel index sequence to perform a search in the received frequency band; a determining unit for receiving a Received Signal Strength Indication (RSSI) of a channel according to the channel index sequence from the reader receiver and determining whether a channel is available or not; a second generating unit for generating a new channel index sequence if available channel is not searched for a channel searching time inputted from the reader controller; and a third generating unit for generating a new channel index sequence if tag data is not obtained for a channel occupying time inputted from the reader controller. The FHSS controller may include: a generating unit for generating a channel index sequence to use for communicating with a tag; and a selecting unit for selecting a next channel according to the channel index sequence at a channel occupying time inputted from the reader controller.

The anti-collision state machine may decide the reader command message and a communication result to transfer to reader controller according to a tag response state reported from the CRC checker. The anti-collision state machine may include: an anti-collision unit for performing an anti-collision operation for obtaining electronic product code (EPC) from one tag by controlling collision among a plurality of tags; and a tag accessing unit for performing a tag accessing operation for obtaining user-specific data of the tag using the obtained EPC through the anti-collision operation. The anti-collision state machine determines whether the tag accessing operation may be performed or not using length information for reading the user memory included in a command for reading a user memory of a tag.

In accordance with another aspect of the present invention, there is provided a method of controlling a radio frequency identification (RFID) reader mounted at a wireless communication terminal, including the steps of: a) selecting one of a Listen Before Talk (LBT) frequency occupying method and a Frequency Hopping Spread Spectrum (FHSS) frequency occupying method to use for communication with a tag; b) selecting a channel to use for communicating with a tag according to the selected frequency occupying method; c) obtaining tag information using the selected channel; and d) receiving the obtained tag information from a reader controller. The step c) may include the step of: c-1) obtaining Electronic Product Code (EPC) from one tag by controlling collision among a plurality of tags. The step c) may further include the step of: c-2) obtaining user-specific data of the tag using the obtained EPC from the step c-1). The step c) may further include the step of: c-3) determining whether the step c-2) is performed or not using length information for reading the user memory included in a command for reading a user memory of the tag. The method may further include the step of switching a frequency occupying method if tag information is not obtained for a predetermined at the step c).

The step b) may include the steps of: b-1) turning off a transmitting power when the LBT frequency occupying method is selected at the step a); b-2) generating a channel index sequence for searching a channel to use for communicating with a tag; b-3) determining whether a channel selected according to the channel index sequence is available or not; and b-4) selecting the channel to communicate with a tag if the selected channel at step b-3) is available, and turning on the transmitting power. The step b) may further include the steps of: b-5) generating a new channel index sequence if an available channel is not searched within a channel searching time set at the reader controller; and b-6) generating a new channel index sequence if tag information is not obtained within a channel occupying time inputted from the reader at the step c).

The step b) may include the steps of: b-7) generating a channel index sequence for communicating with a tag when the FHSS frequency occupying method is selected at the step a); and b-8) selecting a next channel according to the channel index sequence at a channel occupying time inputted from the reader at the step c). The step c) may include the steps of: c-1) initializing state parameters denoting a response state of a tag; c-2) deciding the state parameters according to the response state of the tag by checking a cyclic redundancy check (CRC) of a tag signal demodulated and decoded after receiving the tag signal from the tag; and c-3) deciding a command to transmit to a tag according to the decided state parameters.

The step c-1) may include the steps of: transmitting a QueryRep command and reducing a reader slot value if a tag response for a Query command is not received; transmitting a QueryRep command and reducing a reader slot value if a tag response for an Ack command is not received; and transmitting a QueryRep command and reducing a reader slot value if a CRC error is in a tag response for the Ack command. The step c-2) may include the steps of: performing the step c-1) if a tag response for a Req_RN command is not received; and performing the step c-1) if a CRC error is in a tag response for the Req_RN.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. When it is determined that detailed description on related art in the description of the present invention may obscure the points of the present invention, the description will not be provided herein. Hereinafter, embodiments of the present invention will be described with reference to the accompanying drawings.

Figure 1:
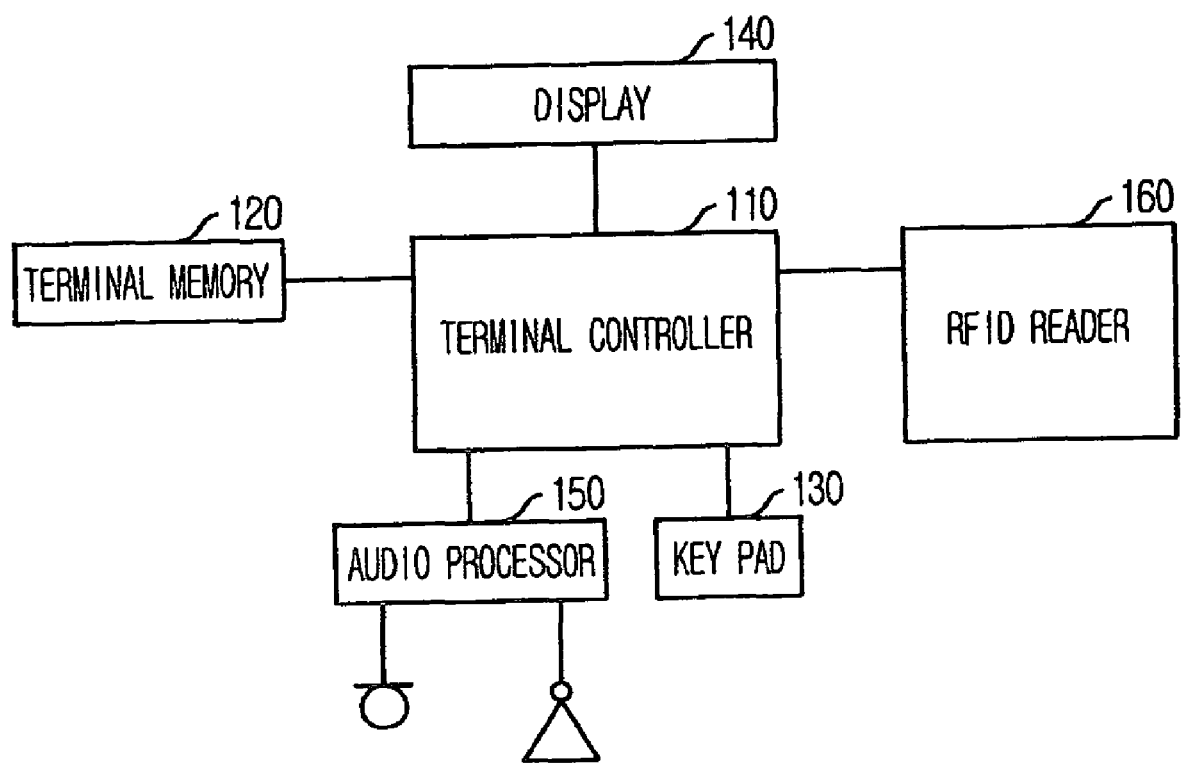
FIG. 1 is a block diagram showing a wireless communication terminal equipped with a Radio Frequency Identification (RFID) reader in accordance with an embodiment of the present invention.

FIG. 1 is a block diagram showing a wireless communication terminal equipped with a Radio Frequency Identification (RFID) reader in accordance with an embodiment of the present invention.

Referring to FIG. 1, a terminal memory 120 may be composed of a program memory and a data memory. The program memory stores programs for controlling general call operation of the wireless communication terminal and programs for executing a mobile RFID service and displaying the result on a display unit. The data memory temporarily stores data generated in the middle of executing the programs. The audio processor 150 recovers audio signals outputted from a terminal controller or transmits audio signals generated in a microphone to the terminal controller. A keypad 130 includes keys for inputting number or text data and function keys for setting up diverse functions. It may also include function keys for inputting a wait command for preparing a mobile RFID reader for operation or a read command for commanding the mobile RFID reader to read tag information in accordance with an embodiment of the present invention. Meanwhile, the display 140 shows an operation result of the mobile RFID service, and the display 140 may be a liquid crystal display (LCD).

The terminal controller 110 controls the general operation of the wireless communication terminal, transfers the wait command for preparing the mobile RFID reader 160 for operation or the read command for executing communication with a tag to the mobile RFID reader 160, which will be simply referred to as an RFID reader hereinafter, and receives tag information including electronical product code (EPC) which is acquired from the communication with the tag in the RFID reader 160.

The RFID reader 160 receives the wait command or the read command for beginning communication with the tag from the terminal controller 110. Upon receipt of the read command, the RFID reader 160 occupies an UHF band frequency in a Listen Before Talk (LBT) or Frequency Hopping Spread Spectrum (FHSS) method, performs reader-to-tag communication based on an RFID protocol, and transmits the tag information, i.e., EPC, acquired from the communication with the tag to the terminal controller 110.

Figure 2:
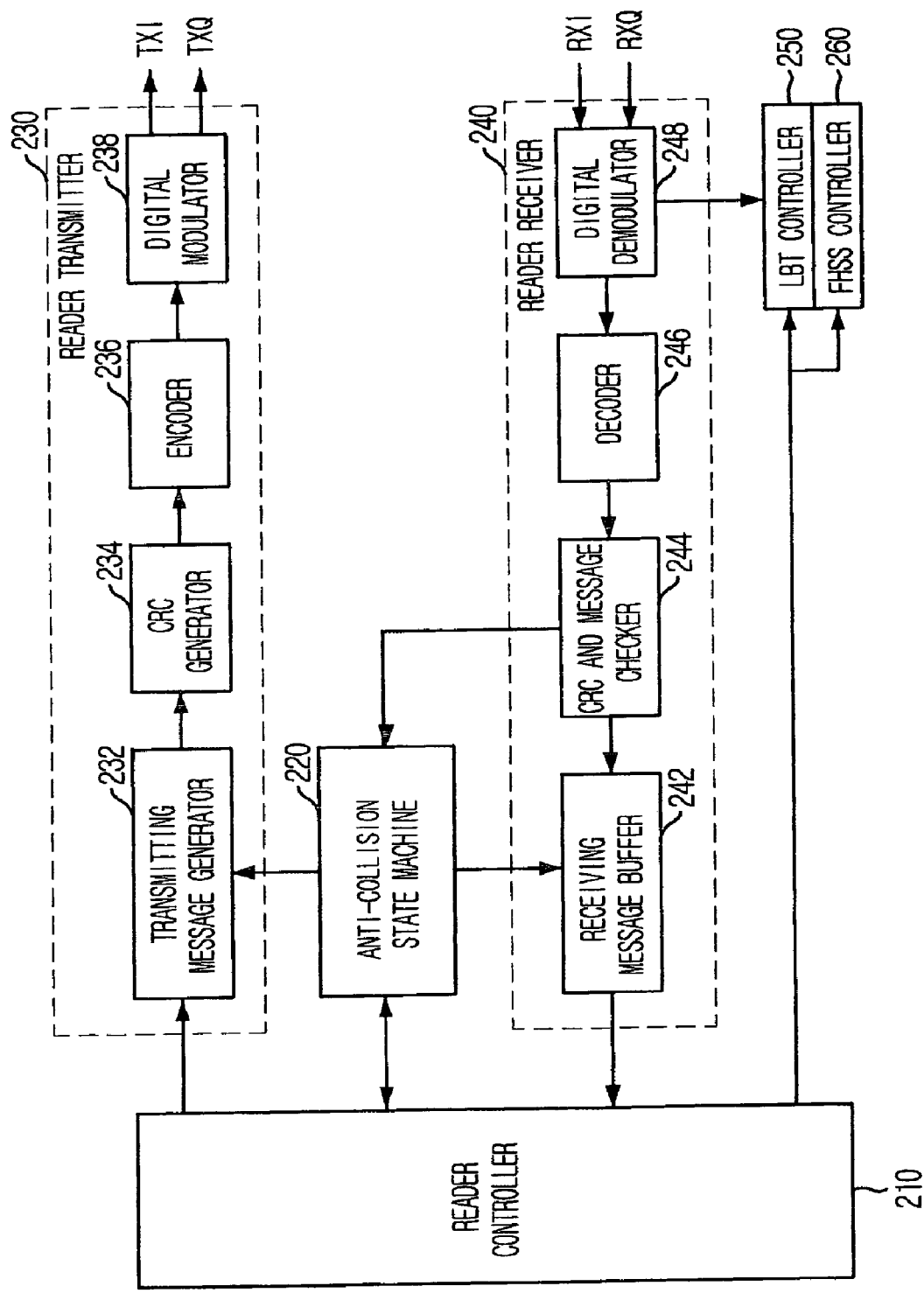
FIG. 2 is a block diagram illustrating a mobile RFID reader in accordance with an embodiment of the present invention.

FIG. 2 is a block diagram illustrating a mobile RFID reader in accordance with an embodiment of the present invention. The RFID reader of the present embodiment communicates with a passive RFID tag in the UHF band. Hereinafter, an example where the RFID reader of the present invention is operated based on the ISO/IEC 18000-6C International Standard Specification, which is an RFID protocol specification in the UHF band ranging from 860 MHz to 960 MHz.

As shown in FIG. 2, the RFID reader includes a reader control unit 210, a reader transmitting unit 230, a reader receiving unit 240, an anti-collision state machine 220, an LBT control unit 250, and an FHSS control unit 260. The reader control unit 210 receives commands for operating the RFID reader from the terminal controller. The reader transmitting unit 230 transmits reader command data in reader-to-tag communication. The reader receiving unit 240 receives data from a tag in the communication with the tag. The anti-collision state machine 220 controls collision among a plurality of tags in the communication with the tag. The LBT control unit 250 performs LBT control, and the FHSS control unit 260 performs frequency hopping spread spectrum.

The reader control unit 210 controls diverse registers n the RFID reader, and address pins used for the control of the registers are defined according to the number of the registers to be used. Also, the reader control unit 210 may use a chip select signal, a read signal, a write signal, and an output enable signal to control the registers. Meanwhile, the reader control unit 210 controls the blocks shown in FIG. 2, and uses a synchronous interface for Central Processing Unit (CPU) clock among the blocks. According to the present invention, the reader control unit 210 can determine whether to use the LBT method or the FHSS method to communicate with the tag, set an LBT variable needed for the determination in the LBT control unit 250, or sets an FHSS variable in the FHSS control unit 260. Also, the reader control unit 210 sets reader commands needed for the communication with the tag in a transmission message generator 232, and receives tag information including EPC acquired from the communication with the tag from a receiving message buffer 242.

The reader transmitting unit 230 includes a transmission message generator 232, a Cyclic Redundancy Check (CRC) generator 234, an encoder 236, and a digital modulator 238.

The transmission message generator 232 generates command messages to be transmitted to the tag upon receipt of a command from the anti-collision state machine 220. The generated messages include commands used in the process of 'Inventory' such as 'Query,' 'QueryAdjust,' 'QueryRep,' and 'Ack,' and commands used in the process of 'Access' such as 'Req_RN,' 'Read,' and 'Write.' The CRC generator 234 generates CRC for frames of the above-generated transmission message and adds the CRC to the transmission message. The generation and addition of the CRC may be carried out in the transmission message generator 232.

The encoder 236 encodes message data transmitted through the transmission message generator 232 and the CRC generator 234. According to the International Standard ISO/IEC 18000-6C Specification, the encoder 236 performs Pulse-Internal Encoding (PIE). Also, the digital modulator 238 receives the encoded data from the encoder 236 and generates and shapes a wavelength form for DSB-ASK or PR-ASK. The digital modulator 238 may include a Root Raised Cosine (RRC) filter for shaping the wavelength form of the encoded data properly to the International Standard ISO/IEC 18000-6C. In this case, the RRC filter limits unnecessary band in the RF terminal, removes interference among symbols, and shapes a normalized envelope for communication with the tag. The signals outputted from the digital modulator 238 are inputted to a Digital-to-Analog Converter (not shown) to be converted into analog signals. The analog signals are up-converted into the UHF band, amplified, and then transmitted to the tag through a reader antenna.

Meanwhile, the reader receiving unit 240 includes a digital demodulator 248, a decoder 246, a CRC and message checker 244, and a receiving message buffer 242.

The digital demodulator 248 according to the present embodiment receives a digital signal downlink transformed and converted after receiving the signal through a reader antenna and performs a digital demodulation such as amplitude shift keying (ASK) demodulation scheme. Also, the digital demodulator 248 measures a Received Signal Strength Indication (RSSI) of a receiving signal according to the present embodiment and reports the measured RSSI to the LBT controller 250.

The decoder 246 receives the demodulated signal from the digital demodulator and performs a FM0 (bi-phase space encoding) or Miller Sub-carrier decoding.

The CRC and message checker 244 checks whether there is an error in the CRC by calculating the CRC of the tag data transmitted from the decoder, checks a tag information message, and reports a tag response state and whether there is an error in the CRC to the anti-collision state machine 220. One of major issue for embodying a mobile RFID reader is to restore tag information from a signal received from a tag without performance degradation. Since the CRC and message checker 244 according to the present embodiment calculates and checks the CRC and of a received data, the load of the reader controller can be reduced in the present embodiment.

The receiving message buffer 242 buffers the receiving message data transmitted from the CRC and message checker. It also transmits the buffered tag data, e.g., EPC or user specific data, to the reader control unit 210 upon receipt of a command from the anti-collision state machine 220.

The anti-collision state machine 220 controls the operation of the RFID reader for the reader-to-tag communication upon receipt of a command from the reader control unit 210. To be specific, when the anti-collision state machine 220 receives a command for starting communication with the tag from the reader control unit 210, it controls the transmission message generator 232 to generate a reader command. Also, the anti-collision state machine 220 reports tag information reception state, which is transmitted from the CRC and message checker 244, to the reader control unit 210, and determines a reader command to be transmitted to the tag based on the tag information state reported by the CRC and message checker 244. Also, when the reader receiving unit 240 has successfully acquired tag information including EPC, it controls the receiving message buffer 242 to transmit the acquired tag information, which includes EPC or user-specific data, to the reader control unit 210.

Meanwhile, the anti-collision state machine 220 prevents collision between tags in the reader-to-tag communication. Anti-collision means a process that the RFID reader identifies one tag among a plurality of tags and acquires tag information of the tag. Reader commands used in the anti-collision process include 'Select,' 'Query,' and 'QueryRep.'

The LBT control unit 250 receives a variable for executing LBT from the reader control unit 210 and executes the LBT. To be specific, the LBT control unit 250 generates a frequency channel index sequence to search for a channel to be used in communication with the tag, and receives a Received Signal Strength Indication (RSSI) from the digital demodulator 248, and RSSI is selected based on the generated channel index sequence. Then, the LBT control unit 250 determines whether there is an empty channel by comparing the received RSSI with a predetermined threshold value, determines a channel to be used for the communication with the tag, and transmits the result to the reader control unit 210 or the anti-collision state machine 220 to thereby start communication with the tag.

Meanwhile, the FHSS control unit 260 receives the variable for executing FHSS from the reader control unit 210 and executes FHSS. To be specific, the FHSS control unit 260 generates a frequency channel index sequence, occupies a channel based on the generated channel index sequence, and starts communication with the tag.

The LBT controller 250 and the FHSS controller 260 may share a PLL controller (not shown) that generates control parameters PLL_CLK, PLL_DATA, and PLL_ENABLE for PLL of a RF unit (not shown). That is, the LBT controller 250 and the FHSS controller 260 may perform a uniformly distributed random numbers generation function by sharing a PLL R, N, F counter table for PLL control.

Finally, the RFID reader of the present invention additionally includes a clock generator (not shown) for supplying diverse clock signals to be used in the RFID reader. The clock generator generates and provides clocks and control signals to be used in the RFID reader. Since the clock generator has a timer for operating the reader control unit 210 in real-time, it can reduce the load of the reader control unit.

Figure 3:
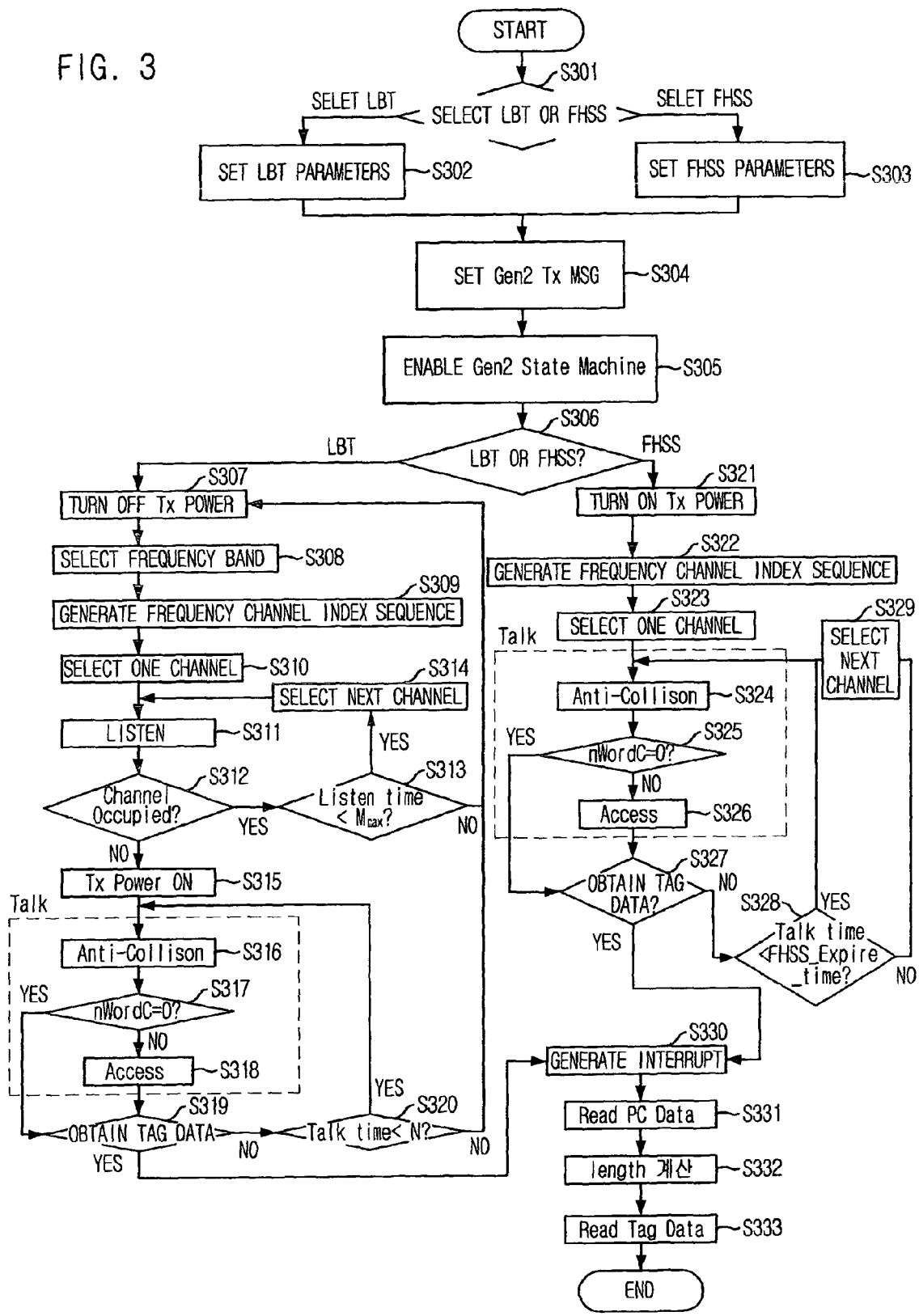
FIG. 3 is a flowchart for describing operations of a mobile RFID reader in accordance with an embodiment of the present invention.

FIG. 3 is a flowchart for describing the operation of a mobile RFID reader in accordance with an embodiment of the present invention.

The operation of a mobile RFID reader includes tag communication preparing steps S301 to S305 for setting commands and basic parameters for the operation of the RFID reader, tag information obtaining steps S306 to S330 for obtaining tag information by communicating with a tag based on a LBT or a FHSS frequency occupying method, and tag information reading steps S331 to S333 for reading the obtained tag information. The tag information obtaining steps S306 to S329 includes anti-collision steps S316 and S324 for controlling collision among a plurality of tags and obtaining electronic product code (EPC) from a tag, and tag accessing steps S318 and S326 for obtaining user-specific data stored in a user memory of a tag.

Hereinafter, the operation of the mobile RFID reader in accordance with an embodiment of the present invention will be described with reference to FIGS. 2 and 3. The mobile RFID reader is operated at Ultra-High Frequency (UHF) based on ISO/IEC18000-6C.

The tag communication preparing steps S301 to S305 for setting commands and basic parameters for the operation of the RFID reader include a frequency selection step, a LBT or FHSS control parameter setting step, and a reader command setting step. Hereinafter, the operation of the RFID reader at the tag communication preparation step will be described.

The mobile RFID reader according to the present embodiment initializes a reader memory when the power is supplied. When a reader controller 210 receives a read command to communicate with a tag from a terminal controller 110, the reader controller 210 selects a frequency occupying method for communicating with a tag at step S301. The terminal controller 110 is also allowed to select the frequency occupying scheme. Table 1 shows an example of setting a frequency occupying method for communicating with a tag by a variable LBT_FHSS.

TABLE 1

| Addr | Fiedl (Data) | Action |
|---|---|---|
| 0x3A | LBT_FHSS | Write |

The terminal controller 110 or the reader controller 210 may refer to the operating environment of the RFID reader for selecting the frequency occupying method. If many readers that communicate with tags are present in the operating environment of the RFID reader, for example, within a region with 1 Km radius, the LBT frequency occupying method is preferable because the LBT frequency occupying method may reduce the collision among a plurality of readers in a dense interrogator environment where more than 25 readers are present in a same REID reader operating environment.

Meanwhile, the reader controller 210 is allowed to switch the frequency occupying method from the LBT frequency occupying method to the FHSS frequency occupying method when the RFID reader cannot successfully obtain tag information for a predetermined time after communicating with a tag using the LBT frequency occupying method. It is because the performance of the LBT frequency occupying method is abruptly dropped compared to the FHSS frequency occupying method if the number of readers becomes greater than the number of channels although the LBT frequency occupying method provides better performance than the FHSS frequency occupying method when the number of readers is smaller than the number of channels. Also, the reader controller 210 may switch the frequency occupying method from the FHSS frequency occupying method to the LBT frequency occupying method if the reader cannot sucessfully_obtain tag information for a predetermined time after communicating with the tag after using the FHSS frequency occupying method. In more detail, the reader controller 210 is allowed to switch the frequency occupying method if tag information has been not successfully obtained from a receiving message buffer 242 for a predetermined time, if NO_Resp state information is received from an anti-collision state machine 220, or if CRC_ERR state information is received from the anti-collision state machine 220. The No_Resp state information denotes that no response is received from a tag more than predetermined times, and the CRC_ERR state information denotes that a CRC error is generated. When the frequency occupying method changes, the reader controller 210 stops one currently controlling the RF unit of the LBT controller and the FHSS controller and sets parameters for performing the switched frequency occupying method at corresponding one of the LBT controller or the FHSS controller.

If the LBT frequency occupying method is selected at step S301, the reader controller 210 sets LBT parameters for performing the LBT frequency occupying method at the LBT controller 250 at step S302. Table 2 shows the LBT parameters. As shown in Table 2, the LBT parameters include a parameter BAND_SEL for a frequency band to use for the LBT occupying method, a parameter RF_OFF_TIME_M for a time to turn off a RF power until finding a next channel after communicating with a tag, a parameter MAX_LISTEN_TIME_Mmax for a time to search an available channel, a parameter TALK_TIME_N for a channel occupying time for communicating with a tag, and a parameter LISTEN_RSSI_THRESHOLD for a RSSI threshold for determining whether a channel is available or not.

TABLE 2

| Addr | Field (Date) | Action |
|------|--------------|--------|
| 0x3A | BNAD_SEL | WRITE |
| 0x3B | RF_OFF_TIME_M | WRITE |
| 0x3C | MAX_LISTEN_TIME_Mmax | WRITE |
| 0x3D | TALK_TIME_N | WRITE |
| 0x3E | LISTEN_RSSI_THRESHOLD | WRITE |

If a Frequency Hopping Spread Spectrum (FHSS) frequency occupying method is selected at step S301, the reader controller 210 sets FHSS parameters for performing the FHSS frequency occupying method at the FHSS controller 260 at step S303. Table 3 shows FHSS parameter. The FHSS parameter includes a parameter FHSS_EXPIRE_TIME for a channel occupying time for communicating with a tag.

TABLE 3

| Addr | Field (Date) | Action |
|------|--------------|--------|
| 0x23 | FHSS_EXPIRE_TIME | WRITE |

After setting parameters for the selected one of the LBT and FHSS frequency occupying methods, the reader controller 210 sets a reader command Gen2 Tx MSG required for communicating with a tag at the transmitting message generator 232 at step S234. Table 4 shows the reader commands, for example, SELECT, QUERY, READ AND MEMORY, defined according to ISO/IEC 18000-6C which is the RFID protocol in a UHF band.

TABLE 4

| Addr | Field (Date) | Action |
|------|--------------|--------|
| 0x03 | GEN2_TX_MSG(TX_COMMAND_SELECT) | WRITE |
| 0x04 | GEN2_TX_MSG(TX_COMMAND_QUERY) | WRITE |
| 0x05 | GEN2_TX_MSG(TX_COMMAND_READ_MEMORY) | WRITE |

After setting the LBT or the FHSS parameter and the reader commands, the reader controller 210 sets an execution command parameter STATE_HOLD for the operation of the RFID reader for communicating with a tag as shown in Table 5 at step S305. If the execution command parameter STATE_HOLD is set as enable, for example, 1, the RFID reader communicates with a tag by independently occupying a channel based on one of the LBT or the FHSS frequency occupying method.

TABLE 5

| Addr | Field (Data) | Action |
|------|--------------|--------|
| 0x01 | STATE_HOLD | WRITE |

If the execution command parameter STATE_HOLD is enable, the RFID reader obtains tag information from a tag by occupying one channel based on one of the LBT and FHSS frequency occupying methods and communicating with the tag, that is, by performing a Reader-to-Tag communication. When the RFID reader successfully obtains tag information, the anti-collision state machine 220 notices it to the reader controller 210 by generating interrupt. Hereinafter, the tag information obtaining steps S306 to S330 for obtaining tag information by communicating with a tag based on the LBT or the FHSS frequency occupying method will be described.

At first, the tag information obtaining steps S307 to S320 when the LBT frequency occupying method is selected at step S301 will be described.

If the LBT frequency occupying method is selected for communicating with a tag, that is, if the parameter LBT_FHSS_SEL is set as 1, the LBT parameters are set at the LBT controller 250 for performing the LBT frequency occupying method at step S302.

If the execution command parameter STATE_HOLD is enabled for beginning the Reader-to-tag communication, the LBT controller 250 transfers a control signal to a RF unit for turning off a RF transmitting power. Also, the LBT controller 250 sustains a RF power off state for a RF power cutoff time M msec which is set by the parameter RF_OFF_TIME_M using an internal timer at step S307. The RF power cut off time is for accurately measuring RSSI at a digital demodulator 240. Therefore, the RF power cut off time must be set with high precision, for example, higher than about 100 msec according to a general specification. Therefore, the initial setting of the RF power cut off time is 100 msec, and the reader controller 210 is allowed to reset the RF power cut off time.

The LBT controller 250 selects a frequency band to use according to the set parameter BAND_SEL at step S308. It is because a predetermined frequency band is assigned to the LBT frequency occupying method according to a country or a region. In case of Korea, a frequency band from 910 MHz to 914 MHz is assigned for the FHSS frequency occupying method, and the frequency band from 908.5 MHz to 914 MHz is assigned to the LBT frequency occupying method. Therefore, the frequency band 908.5 MHz to 910 MHz is used as a dedicated frequency band for the LBT frequency occupying method. In this case, the LBT controller 250 selects one of a frequency band from 908.5 MHz to 910 MHz with bandwidth 200 kHz and a frequency band from 908.5 MHz to 914 MHz with bandwidth 200 kHz according to the parameter BAND_SET set at step S302.

After deciding the frequency band to use, the LBT controller 250 generates a random frequency channel index sequence using a random seed in the determined frequency band at step S309. Then, the LBT controller 250 selects one channel according to the random frequency channel index sequence, and transfers a PLL control signal such as PLL_CLK, PLL_DATA or PLL_ENALBE to a RF unit for receiving the selected channel at step S310. Herein, the LBT controller 250 waits for a time of setting the PLL value, for example, about 1.5 msec, before performing an next operation for stability.

After setting the PLL value, the digital demodulator 248 receives a corresponding signal and measures Received Signal Strength Indication (RSSI), and the LBT controller 250 receives the measured RSSI from the digital demodulator 248 and performs a Listen operation that determines whether a corresponding channel is available or not by comparing the received RSSI with a RSSI threshold value LISTEN_RSSL_THRESHOLD at steps S311, and S312. If the measured RSSI is greater than the RSSI threshold value, it means that the corresponding channel is used by other reader. Therefore, the LBT controller 248 selects a next channel from the frequency channel index sequence at step S134 and the Listen operation is performed again. Herein, if the time for searching an available channel MAX_LISTEN_TIME_Mmax is exceeded, the frequency band selection step S308 is performed again after turning off the transmitting power for the RF power cut off time M. That is, if an available channel has not been searched for the channel searching time Mmax, the LBT controller 250 performs the step S307. The channel searching time Mmax is initially set as 100 msec, and the reader controller 210 is allowed to update the channel searching time Mmax.

When the LBT controller 250 searches an available channel and occupies the searched channel through the Listen operation, the LBT controller 250 notices it to the reader controller 210 or the anti-collision state machine 220 and transfers the control signal to the RF unit to turn on the transmitting power at step S315. After receiving the control signal, the RF unit supplies power to the RF unit including a frequency uplink converter and a transmitting power amplifier for transmitting a reader command.

The RFID reader begins the Reader-to-Tag communication operation, that is, Talk operation, using the channel searched by the LBT controller. The Reader-to-Tag communication operation includes an anti-collision step S316 for controlling collision among a plurality of tags and obtaining EPC from one tag, and a tag accessing step S318 for obtaining user-specific data stored in a user memory of a tag. Since the Reader-to-Tag communication operation S316 to S318 for the LBT frequency occupying method is identical to Reader-to-Tag communication operation S324 to S326 for the FHSS frequency occupying method, it will be described in later with reference to FIGS. 4 and 5.

The LBT controller 250 includes a Talk timer for managing a time spending for the RFID reader to perform the Reader-to-Tag communication operation, that is, the Talk operation. at step S320, the LBT controller 250 also determines whether the time of the Reader-to-Tag communication operation exceeds the channel occupying time N sec for obtaining tag information that is set by the parameter TALK_TIME_N. If the time for Reader-to-Tag communication operation exceeds the channel occupying time N sec, the LBT controller 250 transfers a control signal to the RF unit to end the Reader-to-Tag communication operation, and the step S308 is performed again after turning off the transmitting power of the RF unit for the RF power cutting off time M at step S307. On the contrary, when the time of Reader-to-Tag communication operation does not exceed the channel occupying time N sec although it fails to obtain the tag information, the Reader-to-Tag communication operation is performed from the collision control step S316. The channel occupying time N may be set as 4 sec, and the reader controller is allowed to update the channel occupying time N.

The tag information obtaining steps S321 to S329 for the FHSS frequency occupying method are performed similar to those for the LBT frequency occupying method but they are different in a view that a channel searching step is not performed for the FHSS frequency occupying method. Hereinafter, the tag information obtaining steps S321 to S239 for the FHSS frequency occupying method selected at step S301 will be described.

At first, if the FHSS frequency occupying method is selected for communication with a tag, that is, if the parameter LBT_FHSS_SEL is set as '0', the FHSS parameters are set to the FHSS controller 260 for performing the FHSS frequency occupying method at step S303 as described above.

If the execution command parameter STATE_HOLD is enabled for beginning the Reader-to-Tag communication operation at step S305, the FHSS controller 260 transfers a control signal to a RF unit to turn on the RF transmitting power at step S321 and generates a random frequency channel index sequence using a random seed at step S322. Then, the FHSS controller 260 selects one channel according to the frequency channel index sequence and transfers PLL control signals such as PLL_CLK, PLL_DATA, and PLL_ENABLE to the RF unit at step S323. Herein, the FHSS control unit 260 waists for a time for setting the PLL value, for example, about 1.5 msec and performs a next operation for stable operation.

Since the channel searching step is not required for the FHSS frequency occupying method, the RFID reader occupies a channel according to the frequency channel index sequence generated at the FHSS controller 260 regardless of the Listen operation and begins the Reader-to-Tag communication operation. The Reader-to-Tag communication includes an anti-collision step S324 and a tag accessing step S326. Since the Reader-to-Tag communication operation S324 to S326 for the FHSS frequency occupying method is identical to that for the LBT frequency occupying method, it will be described in later with reference to FIGS. 4 and 5.

The FHSS controller 260 includes a Talk timer for managing a time for the RFID reader to perform the Talk operation, that is, the Reader-to-Tag communication operation. The Talk timer may be shared with the LBT controller. The FHSS controller 260 determines whether the time for the Reader-to-Tag communication operation exceeds the channel occupying time FHSS_EXPIRE_TIME which is set for obtaining the tag information at step S328. If the time for the Reader-to-Tag communication operation exceeds the channel occupying time FHSS_EXPIRE_TIME, the FHSS controller 260 transfers a control signal to the anti-collision state machine 220 to end the Reader-to-Tag communication operation and performs a Reader-to-Tag communication operation from the anti-collision step S324 by selecting a next channel according to the generated frequency channel index sequence. Meanwhile, if the time for Reader-to-Tag communication operation does not exceed the channel occupying time FHSS_EXPIRE_TIME although it fails to obtain the tag information, a Reader-to-Tag communication operation is performed from the anti-collision step S324. The channel occupying time FHSS_EXPIRE_TIME may be set as 0.4 sec, and the reader controller is allowed to update the channel occupying time.

Hereinafter, the Reader-to-Tag communication operation S316 to S318 and S324 to S326 will be described with reference to FIGS. 4 and 5.

The Reader-to-Tag Communication operation S316 to S318 and S324 to S326 allows a RFID reader to obtain single tag information without collision and to read user-specific data by accessing a selected tag memory although a plurality of tags present within a reader operating range in a mobile RFID environment. Such a Reader-to-Tag communication operation is generally divided into anti-collision steps S316 and S324, and tag accessing steps S318 and S326. Whether to perform the tag access step is determined by a word count parameter nWordC included in a read command for reading a user memory. If the word count nWordC is 0, the RFID reader performs the anti-collision step only. Otherwise, the tag accessing step is additionally performed using EPC data obtained from the anti-collision steps.

The Reader-to-Tag communication operation is controlled by an anti-collision state machine 220. The anti-collision state machine 220 controls the operation of the RFID reader for communicating with a tag according to the receiving state TagResp of tag information transferred from the CRC and message checker 244. The state TsgResp of signal received from the tag is classified into a state of successfully-receiving tag information from a tag 'TagResp==OK', a state of no response from a tag 'TagResp==No_Resp', and a state of error in tag data or CRC 'TagResp==CRC_ERR'.

Figure 4:
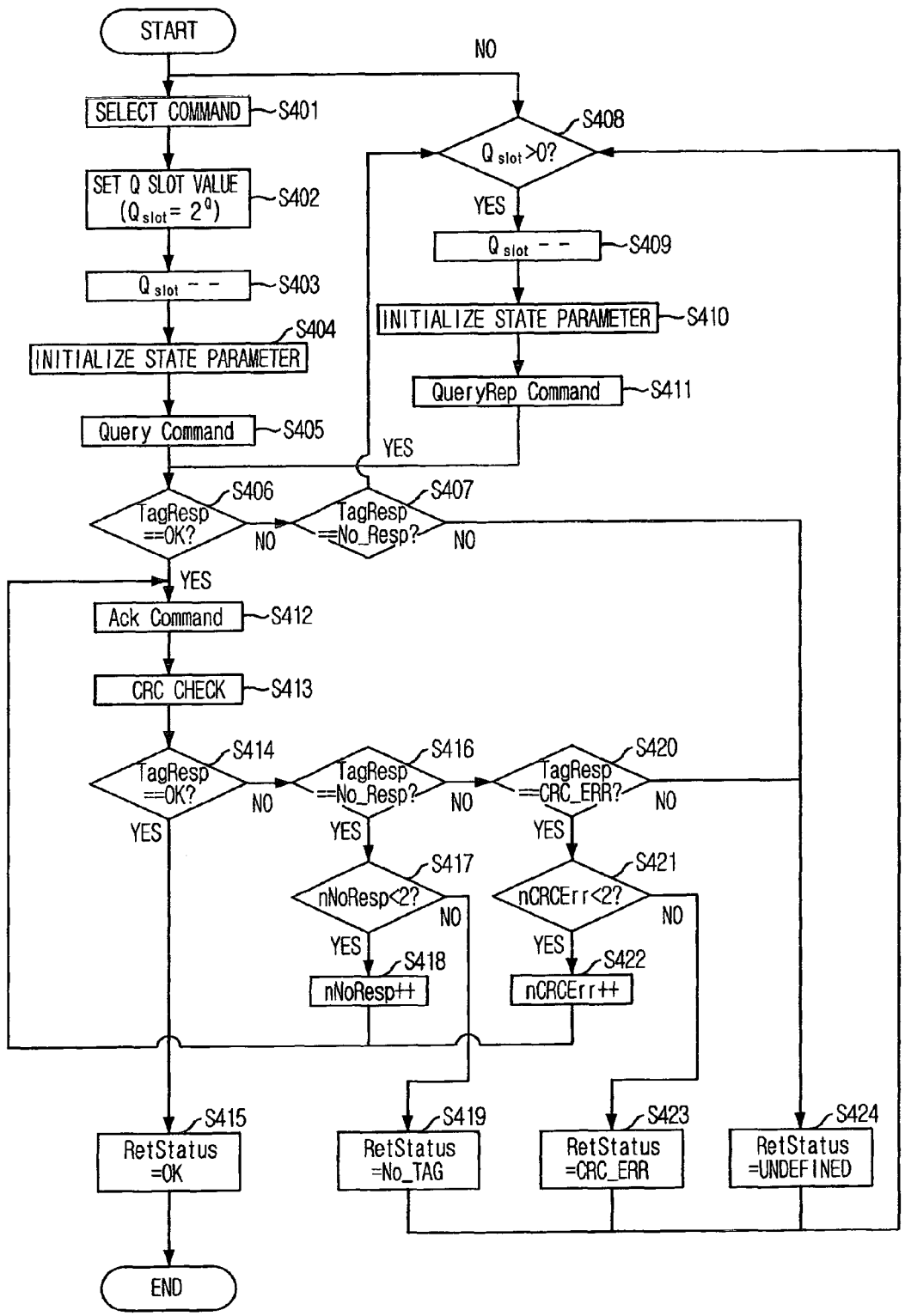
FIG. 4 is a flowchart for describing an anti-collision operation in accordance with an embodiment of the present invention.

FIG. 4 is a flowchart for describing the operation of a RFID reader in anti-collision steps S316 and S324 for controlling collision among a plurality of tags and obtaining EPC from a tag in accordance with an embodiment of the present invention. At the anti-collision steps, one tag information, that is, EPC data, is obtained in an order of Select, Query, Ack basically. Also, a command QueryRep (QueryRepeat) is used for obtaining the information, EPC data, of a tag with non-zero slot.

Referring to FIG. 4, when a channel is selected for Reader-to-Tag communication operation by the LBT controller 250 or the FHSS controller 260, the anti-collision state machine 220 instructs the transmitting message generator 232 to generate a Select command at step S402. Also, the anti-collision state machine 220 sets a Q slot value ($Q_{slot}$) to '$2^Q-1$' at steps S402 and S403 after determining the value of Q. The anti-collision state machine 220 initializes state parameters TagResp, nNoResp, and nCRCErr at step S404. In the present embodiment, four slots (Q=2) are selected to read small number of tags in a mobile RFID environment.

Then, the anti-collision state machine 220 instructs the transmitting message generating unit 232 to generate a Query command including the Q value information. The reader transmitting unit generates the Query command and transmits the Query command to a tag so as to being Inventory operation at step S405. The response signal for the Query command from a tag is decoded by a decoder 246, and the decoded signal is transmitted to the CRC and message checker 244. The CRC and message checker 244 reports the receiving state of the tag data to the anti-collision state machine 220. The anti-collision state machine 220 notices the no-response state to the reader controller 210 when no response is received from a tag (TsgResp==No_Resp) at step S424. Then, the anti-collision state machine 220 reduces the slog value $Q_{slot}$ by one, initializes the state parameters, and instructs the transmitting message generating unit 232 to generate a command Query Rep at steps S408 to S411. Herein, if the slot value is 0, the step S401 is performed again.

If a response for the Query command generated at step S405 or a response for the QueryRep command generated at step S411 is received from a tag, the anti-collision state machine 220 instructs the transmitting message generating unit 232 to generate an Ack command at step S412. The CRC and message checker 244 checks a cyclic redundancy check CRC of a tag response signal for the Ack command and transfers the tag response state information and the CRC check result to the anti-collision state machine 220 at step S413. The anti-collision state machine 220 transmits the AcK command twice at steps S417 and S418 when no tag response is received, and notices no tag response state RetStatus==No_TAG to the reader controller 210 at step S419 when the response is not received from a tag continually. The anti-collision state machine 220 transmits the Ack command twice at step S421 and S422 when an error is in the CRC of a received data from a tag. If the CRC is continually found, the anti-collision state machine 220 notices it to the reader controller 210 at step S423. As described above, if the tag response form the Ack command is not successfully received, the step S408 for obtaining tag information having different slot value is performed again.

Meanwhile, if the tag response for the Ack command is successfully received, the anti-collision state machine 220 transfers the state information RetStatus==OK to the reader controller 210 to inform that the tag response is successfully received, and generates an interrupt for the reader controller to read the tag data at steps S415 and S330. The ant-collision state machine 220 determines whether the tag accessing step is performed or not according to a word count (nWordC) value which is a variable for reading user at step S317. If the value of word count is 0 and the value of Q slot is 0, the anti-collision state machine 220 terminates the anti-collision steps. On the contrary, if the Q slot value is not 0, a step S409 for obtaining tag information having different slot value is performed.

Figure 5:
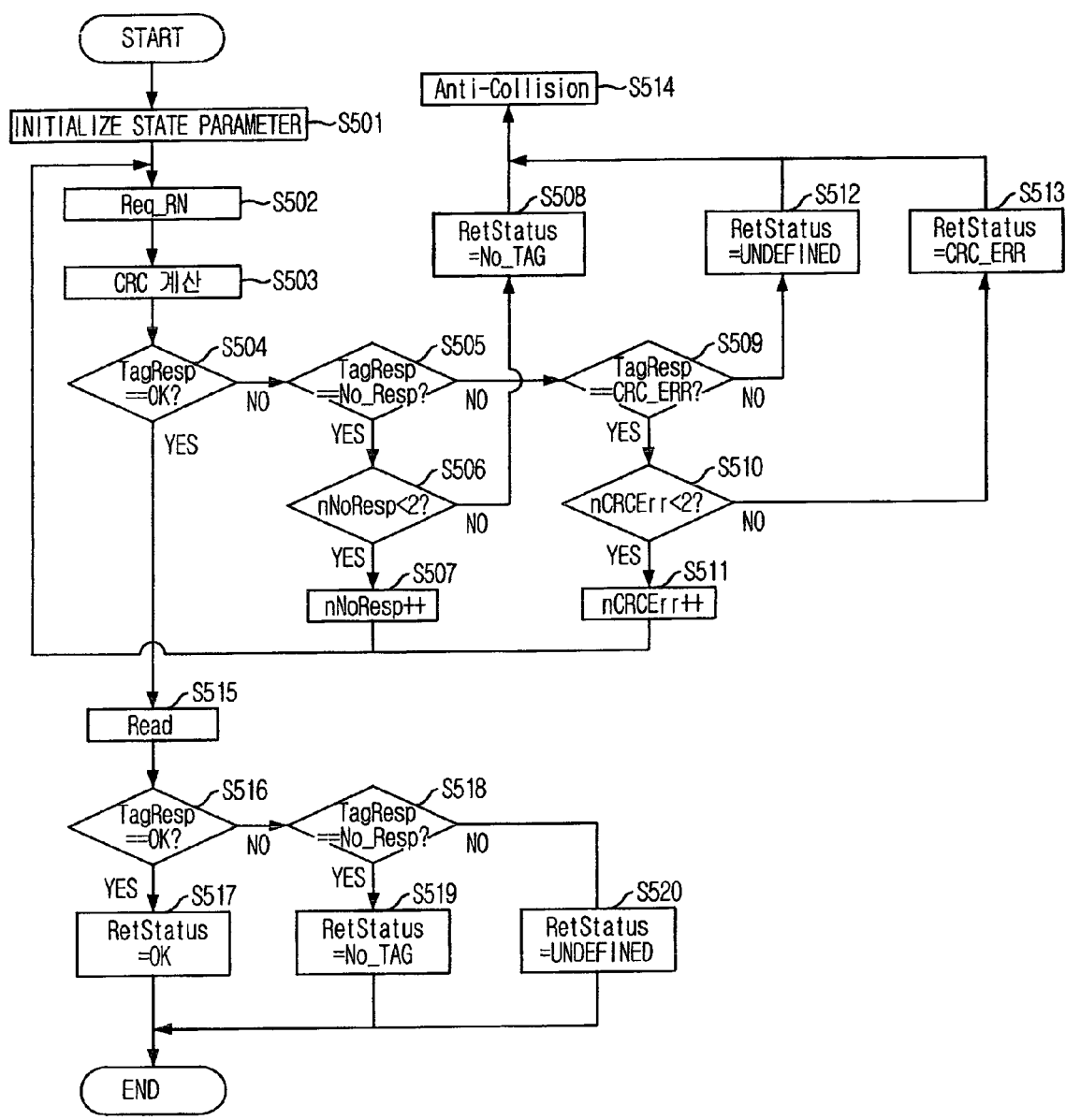
FIG. 5 is a flowchart for describing a tag accessing operation in accordance with an embodiment of the present invention.

FIG. 5 is a flowchart for describing the operation of a RFID reader in the tag accessing steps S318 and S326 in accordance with an embodiment of the present invention. The tag accessing step is performed when the word count (nWordC) value is not 0, which is included in a read command, and user specific data of a user memory is obtained using EPC tag data obtained through the anti-collision steps.

Referring to FIG. 5, the anti-collision state machine 220 initializes state parameters at step S501, and instructs the transmitting message generating unit 232 to generate a Req_RN command at step S502. The tag receiving the Req_RN command transits its state to an Open state or a Secured state for enabling a read and a write operation to a tag. Meanwhile, the CRC and message checker 244 checks the CRC of a tag response signal for the Req_RN command at step S503, and transfers the tag response state information with whether the CRC error is present or not to the anti-collision state machine 220. The anti-collision state machine 220 transmits the Req_RN command twice at step S506 and S507 when the anti-collision state machine 220 does not receive the response from a tag (TagResp==No_Resp). If the tag response is not received continually, the anti-collision state machine notices the reader controller 210 with no tag response state (RetStatus=No_TAG) at step S508. The anti-collision state machine 220 transmits the Req_RN command twice when the error is present in the CRC of tag data at step S510 and S511. If the CRC error is continually generated, the anti-collision state machine 220 notices the reader controller 210 with the CRC error state (RetStatus==CRC_Err) at step S513. The RFID reader performs the anti-collision steps of FIG. 4 at step S514 if the tag response for the Req_RN is not successful.

If the tag response for the Req_RN command is successfully received, the anti-collision state machine 220 instructs the transmitting message generating unit 232 to generate a read command for obtaining user-specific data of a tag at step S515. The CRC and message checker 244 notices the anti-collision state machine 220 with the receiving state of a tag signal from the read command. The anti-collision state machine 220 notices the reader controller 210 with no tag response at step S519 when no tag response for the read command is received. If the tag response for the read command is successfully received, the anti-collision state machine 220 notices it (RetStatus=OK) to the reader controller 210, and generates an interrupt for the reader controller 210 to read user-specific data at step S517 and S330.

Hereinafter, tag information reading steps S330 to S332 for transferring the tag information obtained from the tag information obtaining steps S306 to S329 to the reader controller will be described.

The reader controller 210 receives the interrupt noticing successful tag information obtaining from the anti-collision state machine 220, the reader controller 210 reads the tag information from the receiving message buffer 242. In more detail, the reader controller 210 calculates the length of the EPC by reading Protocol-control (PC) data having information about the length of the EPC among the tag information and analyzing the read PC data at step S330 and S331. Then, the reader controller 210 finally obtains EPC data by reading the EPC in a unit of word, for example, 16 bits, included in the tag information based on the calculated length.

Meanwhile, the description for the tag information reading steps S330 to S332 is a case of performing anti-collision steps S316 and S324 for a RFID reader to obtain the EPC from a tag. If the tag information obtaining step to the tag accessing steps S318 and S326 are performed, the reader controller 210 receives the interrupt noticing the successful user-specific data obtaining from the anti-collision state machine 220 and reads the user-specific data from the receiving message buffer 240.

Such electronic product code (EPC) or the user-specific data are transferred to the terminal controller 110, stored in the terminal memory 120 or displayed on a display 140. Also, the EPC or the user-specific data may be used to request tag content information to a contents server (CS) through a mobile communication network and Internet network in a mobile RFID service.

As described above, the RFID reader according to the present invention provides a core function of a RFID reader operated at Ultra-High Frequency (UHF) by being mounted at a wireless communication terminal. Also, the RFID reader according to the present invention increases a RFID processing speed through the anti-collision state machine for effectively controlling the Reader-to-Tag communication operation and reduces the load of the RFID reader controller.

Especially, the present invention provides a mobile RFID reader and a control method thereof for supporting both of the FHSS frequency occupying method and the LBT frequency occupying method performed in the UHF band. The mobile RFID reader and the control method thereof according to the present invention allows the reader controller or the terminal controller to select one of the FHSS and LBT frequency occupying methods to be suitable to the mobile RFID environment where the Reader-to-Tag communication operation is performed. Therefore, the time for obtaining the tag information is reduced. Also, the mobile RFID reader and the control method thereof allow the terminal controller and the reader controller to switch the frequency occupying methods when the tag information is not obtained for a predetermined time. Therefore, the time for obtaining the tag information is reduced.

As described above, the method of the present invention is realized as a program and stored in a computer-readable recording medium, such as a CD-ROM, RAM, ROM, floppy disk, hard disk, a magneto-optical disk, and the like. As the process can be easily implemented by those skilled in the art of the present invention to which the present invention pertains, the process will not be described in detail herein.

The present application contains subject matter related to Korean patent application No. 2005-0088871 and 2006-42578, filed with the Korean Intellectual Property Office on Sep. 23, 2005, and May 11, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A radio frequency identification (RFID) reader mountable to a wireless communication terminal, comprising:
    a reader controller for beginning a reader operation to communicate with a tag in response to a command of a terminal controller of the wireless communication terminal;
    an anti-collision state machine for controlling collision among a plurality of tags, and transferring the result of communication with the tag to the reader controller;
    a reader transmitter for generating a reader command message decided at the anti-collision state machine, and coding and modulating the generated reader command message;
    a reader receiver for demodulating and decoding a tag signal received from tag, and reporting a tag response state to the anti-collision state machine; and
    a channel controller for selecting a channel to use to communicate with a tag in response to a command of the reader controller,
    wherein the RFID reader is sized and shaped to be mounted to a wireless communication terminal,
    wherein the reader controller selects one of a Listen Before Talk (LBT) frequency occupying method and a Frequency Hopping Spread Spectrum (FHSS) frequency occupying method to communicate with the tag,
    wherein the reader controller switches from the LBT frequency occupying method to the FHSS frequency occupying method, if tag data is not successfully obtained for a predetermined time when the LBT frequency occupying method is used.

2. The RFID reader as recited in claim 1, wherein the reader transmitter includes:
    a message generator for generating the reader command message;
    a CRC generator for generating a transmitting message by creating a CRC for the reader command message and adding the created CRC to the reader command message;
    an encoder for encoding the generated transmitting message; and
    a modulator for modulating the encoded transmitting message.

3. The RFID reader as recited in claim 1, wherein the reader receiver includes:
- a demodulator for demodulating a tag signal, which is received through an antenna and transformed to a digital signal;
- a decoder for decoding the demodulated tag signal;
- a CRC checker for checking a CRC of the decoded tag signal and reporting a response state of the tag to the anti-collision state machine; and
- a receiving message buffer for temporally storing a message of the decoded tag signal and transferring the stored message to the reader controller in response to a command of the anti-collision state machine.

4. The RFID reader as recited in claim 1, wherein the channel controller includes:
- a LBT controller for performing a Listen Before Talk (LBT) frequency occupying method control; and
- a FHSS controller for performing a Frequency Hopping Spread Spectrum (FHSS) frequency occupying method control.

5. The RFID reader as recited in claim 1, wherein the reader controller switches from the FHSS frequency occupying method to the LBT frequency occupying method if tag data is not successfully obtained for a predetermined time when the FHSS frequency occupying method is used.

6. The RFID reader as recited in claim 4, wherein the LBT controller and the FHSS controller share a PLL controller.

7. The RFID reader as recited in claim 4, wherein the LBT controller includes:
- a first channel index sequence generating means for receiving a frequency band to perform the LBT frequency occupying method and generating a channel index sequence to perform a search in the received frequency band;
- a channel availability checking means for receiving a Received Signal Strength Indication (RSSI) of a channel according to the channel index sequence from the reader receiver and determining whether a channel is available or not;
- a second channel index sequence generating mean for generating a new channel index sequence if available channel is not searched for a channel searching time inputted from the reader controller; and
- a third channel index sequence generating means for generating a new channel index sequence if tag data is not obtained for a channel occupying time inputted from the reader controller.

8. The RFID reader as recited in claim 4, wherein the FHSS controller includes:
- a channel index sequence generating means for generating a channel index sequence to use for communicating with a tag; and
- a selecting means for selecting a next channel according to the channel index sequence at a channel occupying time inputted from the reader controller.

9. The RFID reader as recited in claim 3, wherein the anti-collision state machine decides the reader command message and a communication result to transfer to reader controller according to a tag response state reported from the CRC checker.

10. The RFID reader as recited in claim 1, wherein the anti-collision state machine includes:
- an anti-collision means for performing an anti-collision operation for obtaining electronic product code (EPC) from one tag by controlling collision among a plurality of tags; and
- a tag accessing means for performing a tag accessing operation for obtaining user-specific data of the tag using the obtained EPC through the anti-collision operation.

11. The RFID reader as recited in claim 10, wherein the anti-collision state machine determines whether the tag accessing operation is performed or not using length information for reading the user memory included in a command for reading a user memory of a tag.

12. A method of controlling a radio frequency identification (RFID) reader mounted at a wireless communication terminal, comprising the steps of:
- a) selecting one of a Listen Before Talk (LBT) frequency occupying method and a Frequency Hopping Spread Spectrum (FHSS) frequency occupying method to use for communication with a tag;
- b) selecting a channel to use for communicating with a tag according to the selected frequency occupying method;
- c) obtaining tag information using the selected channel; and
- d) the reader mounted at the wireless communication terminal receiving the obtained tag information in a reader controller; and
- e) switching from the LBT frequency occupying method to the FHSS frequency occupying method, if tag information is not successfully obtained for a predetermined time when the LBT frequency occupying method is used.

13. The method as recited in claim 12, wherein the step c) includes the step of: c-1) obtaining Electronic Product Code (EPC) from one tag by controlling collision among a plurality of tags.

14. The method as recited in claim 13, wherein the c) further includes the step of: c-2) obtaining user-specific data of the tag using the obtained EPC from the step c-1).

15. The method as recited in claim 14, wherein the step c) further includes the step of: c-3) determining whether the step c-2) is performed or not using length information for reading the user memory included in a command for reading a user memory of the tag.

16. The method as recited in claim 12, further comprising the step of switching from the FHSS frequency occupying method to the LBT frequency occupying method if tag information is not obtained for a predetermined time when the FHSS frequency occupying method is used.

17. The method as recited in claim 12, wherein the step b) includes the steps of:
- b-1) turning off a transmitting power when the LBT frequency occupying method is selected at the step a);
- b-2) generating a channel index sequence for searching a channel to use for communicating with a tag;
- b-3) determining whether a channel selected according to the channel index sequence is available or not; and
- b-4) selecting the channel to communicate with a tag if the selected channel at step b-3) is available, and turning on the transmitting power.

18. The method as recited in claim 17, wherein the step b) further includes the steps of:
- b-5) generating a new channel index sequence if an available channel is not searched within a channel searching time set at the reader controller; and
- b-6) generating a new channel index sequence if tag information is not obtained within a channel occupying time inputted from the reader at the step c).

19. The method as recited in claim 12, wherein the step b) includes the steps of:
- b-7) generating a channel index sequence for communicating with a tag when the FHSS frequency occupying method is selected at the step a); and
- b-8) selecting a next channel according to the channel index sequence at a channel occupying time inputted from the reader at the step c).

20. The method as recited in claim 12, wherein the step c) includes the steps of:
- c-1) initializing state parameters denoting a response state of a tag;
- c-2) deciding the state parameters according to the response state of the tag by checking a cyclic redundancy check (CRC) of a tag signal demodulated and decoded after receiving the tag signal from the tag; and
- c-3) deciding a command to transmit to a tag according to the decided state parameters.

21. The method as recited in claim 13, wherein the step c-1) includes the steps of:
- transmitting a QueryRep command and reducing a reader slot value if a tag response for a Query command is not received;
- transmitting a QueryRep command and reducing a reader slot value if a tag response for an Ack command is not received; and
- transmitting a QueryRep command and reducing a reader slot value if a CRC error is in a tag response for the Ack command.

22. The method as recited in claim 14, wherein the step c-2) includes the steps of:
- performing the step c-1) if a tag response for a Req_RN command is not received; and performing the step c-1) if a CRC error is in a tag response for the Req_RN.

* * * * *